United States Patent Office 3,357,981
Patented Dec. 12, 1967

3,357,981
1,2-DIHYDRO-1-HYDROXY-5,6-TRI- AND 5,6-TETRAMETHYLENE PYRIMIDINES
Joseph J. Ursprung and William C. Anthony, Kalamazoo, Mich., assignors to The Upjohn Company, Kalamazoo, Mich., a corporation of Delaware
No Drawing. Filed Dec. 27, 1965, Ser. No. 516,786
9 Claims. (Cl. 260—256.4)

This invention relates to novel compositions of matter and to methods for producing them. In particular, this invention relates to novel 1,2-dihydro-1-hydroxypyrimidines of the formula:

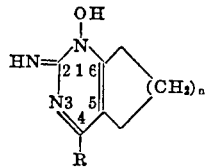

I wherein R is a moiety selected from the group consisting of moieties of the formula

wherein $R_1$ and $R_2$ are selected from the group consisting of hydrogen, lower alkyl, lower alkenyl, lower aralkyl, and lower cycloalkyl, with the proviso that both $R_1$ and $R_2$ are not hydrogen, and the heterocyclic moieties, aziridinyl, azetidinyl, pyrrolidinyl, piperidino, hexahydroazepinyl, heptamethylenimino, octamethylenimino, morpholino, and 4-lower-alkylpiperazinyl, each of said heterocyclic moieties having attached as substituents on carbon atoms thereof zero to 3 lower alkyls, inclusive, a nitrogen atom of each of said heterocyclic moieties being the point of attachment of R to the ring in said formula, and $n$ is 1 or 2. When R is

and $R_2$ can be alike or different. When R is a heterocyclic moiety, the alkyls which can be attached thereto can all be different or any two or all of them can be alike.

The novel 1,2 - dihydro - 1 - hydroxypyrimidines of this invention can also be represented by the formulae:

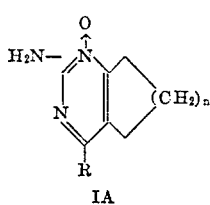 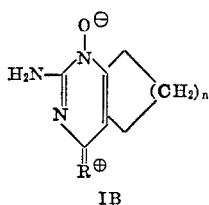

IA　　　　　　　　IB

The compounds of Formulas IA and IB are tautomeric with the compounds of Formula I. For convenience, reference will be made hereinafter only to Formula I. It is to be understood, however, that the novel compounds of this invention are likely to be mixtures of tautomeric forms, the compositions of which are dependent on such factors as the nature of R and the environment. In some instances, one form or another may predominate.

Examples of lower alkyl are methyl, ethyl, propyl, butyl, pentyl, hexyl, heptyl, octyl, and isomeric forms thereof. Examples of lower alkenyl are allyl, 1-methylallyl, 2-methylallyl (methallyl), 2-butenyl (crotyl), 3-butenyl, 1,2-dimethylallyl, 1,1-dimethylallyl, 2-ethylallyl, 1-methyl-2-butenyl, 2-methyl-2-butenyl, 1,1,2-trimethylallyl, 1,3-dimethyl-2-butenyl, 1-ethyl-2-butenyl, 4-methyl-2-pentenyl, 2-ethyl-2-pentenyl, 4,4-dimethyl-2-pentenyl, 2-heptenyl, 2-octenyl, 5-octenyl, 1,4-dimethyl-4-hexenyl, and the like. Examples of lower cycloalkyl are cyclopropyl,
2-methylcyclopropyl,
2,2-dimethylcyclopropyl,
2,3-diethylcyclopropyl,
2-butylcyclopropyl,
cyclobutyl,
2-methylcyclobutyl,
3-propylcyclobutyl,
2,3,4-triethylcyclobutyl,
cyclopentyl,
2,2-dimethylcyclopentyl,
3-pentylcyclopentyl,
3-tert-butylcyclopentyl,
cyclohexyl,
4-tert-butylcyclohexyl,
3-isopropylcyclohexyl,
2,2-dimethylcyclohexyl,
cycloheptyl,
cyclooctyl, and the like.

Examples of lower aralkyl are benzyl,
phenethyl,
1-phenylethyl,
2-phenylpropyl,
4-phenylbutyl,
6-phenylhexyl,
5-phenyl-2-methylpentyl,
1-naphthylmethyl,
2-(1-naphthyl)ethyl,
2-(2-naphthyl)ethyl, and the like.

Examples of heterocyclic moieties within the scope of R, in addition to those already mentioned above, are 2-methylaziridinyl,
2-ethylaziridinyl,
2-butylaziridinyl,
2,3-dimethylaziridinyl,
2,2-dimethylaziridinyl,
2-methylazetidinyl,
3-methylazetidinyl,
2-octylazetidinyl,
2,2-dimethylazetidinyl,
3,3-diethylazetidinyl,
2,4,4-trimethylazetidinyl,
2,3,4-trimethylazetidinyl,
2-methylpyrrolidinyl,
3-butylpyrrolidinyl,
2-isohexylpyrrolidinyl,
2,3-dimethylpyrrolidinyl,
2,2-dimethylpyrrolidinyl,
2,5-diethylpyrrolidinyl,
3-tert-butylpyrrolidinyl,
2,3,5-trimethylpyrrolidinyl,
3,4-dioctylpyrrolidinyl,
2-methylpiperidino,
3-methylpiperidino,
4-methylpiperidino,
3-isopropylpiperidino,
4-tert-butylpiperidino,
2-methyl-5-ethylpiperidino,
3,5-dipentylpiperidino,
2,4,6-trimethylpiperidino,
2,6-dimethyl-4-octylpiperidino,
2,3,5-triethylpiperidino,
2-ethylhexahydroazepinyl, 4-tert-butylhexahydroazepinyl,
3-heptylhexahydroazepinyl,
2,4-dimethylhexahydroazepinyl,
3,3-dimethylhexahydroazepinyl,
2,4,6-tripropylhexahydroazepinyl,
2-methylheptamethylenimino,
5-butylheptamethylenimino,
2,4-diisopropylheptamethylenimino,
3,3-diethylheptamethylenimino,
2,5,8-trimethylheptamethylenimino,
3-methyloctamethylenimino,
2,9-diethyloctamethylenimino,
4-isooctyloctamethylenimino,
2-ethylmorpholino,
2-methyl-5-ethylmorpholino,
3,3-dimethylmorpholino,
2,6-di-tert-butylmorpholino,
4-methylpiperazinyl,
4-isopropylpiperazinyl, and the like.

In each of the above examples of heterocyclic moieties, the free valance, and hence the point of attachment to a carbon atom of the pyrimidine ring, is at the heterocyclic nitrogen atom.

The novel 1,2-dihydro-1-hydroxypyrimidines of Formula I are amines, and exist in the non-protonated or free base form, or in the protonated or acid addition salt form, depending on the pH of the environment. They form stable protonates, i.e., mono- or diacid addition salts, on neutralization with suitable acids, for example, hydrochloric, hydrobromic, sulfuric, phosphoric, nitric, acetic, benzoic, salicylic, glycolic, succinic, nicotinic, tartaric, maleic, malic, pamoic, methanesulfonic, cyclohexanesulfamic, picric, and lactic acids, and the like. These acid addition salts are useful for upgrading or purifying the free bases. The free bases are useful as acid acceptors in neutralizing undesirable acidity or in absorbing an acid as it is formed in a chemical reaction, for example, a dehydrohalogenation reaction in which hydrogen and chlorine, bromine, or iodine are removed from vicinal carbon atoms.

The novel Formula I compounds form salts with fluosilicic acid which are useful as mothproofing agents according to U.S. Patents 1,915,334 and 2,075,359. They also form salts with thiocyanic acid which condense with formaldehyde to form resinous materials useful as pickling inhibitors according to U.S. Patents 2,425,320 and 2,606,155.

The Formula I 1,2-dihydro-1-hydroxypyrimides of this invention also form salts with penicillins. These salts have solubility characteristics which cause them to be useful in the isolation and purification of penicillins, particularly benzyl penicillin. Said salts can be formed either by neutralization of the free base form of a compound of Formula I with the free acid form of a penicillin, or by a metathetical exchange of the anion of an acid addition salt of a Formula I compound, for example, the chloride ion of a hydrochloride, with the anionic form of a penicillin.

The novel Formula I 1,2-dihydro-1-hydroxyprimidines also form carboxyacylates on treatment with carboxyacylating agents, for example, carboxylic acid anhydrides and carboxylic acid chlorides.

Carboxyacylates obtained from Formula I 1,2-dihydro-1-hydroxypyrimidines can be represented by the formula:

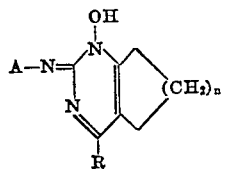

II wherein R and n are defined as above and A is carboxyacyl.

The carboxyacylates of Formula II can be used for upgrading a Formula I 1,2-dihydro-1-hydroxypyrimidine free base. The latter can be transformed to a carboxyacylate, the carboxyacylate purified by conventional techniques, e.g., recrystallization or chromatography, and the purified carboxyacylate deacylated, advantageously by alcoholysis.

The dihydropyrimidine carboxyacylates of Formula II can be represented by other formulas. As for Formula I compounds, these Formula II carboxyacylates are likely to be mixtures of tautomeric forms, the compositions of which are dependent on such factors as the nature of the substituents and the carboxyacyl moieties, and the environment. In some instances, one form or another may predominate. Formula II is used for convneience, and the other tautomeric forms are not excluded.

Carboxyacylates of Formula II are amines and exist in either the nonprotonated (free base) form or the protonated (acid addition salt) form depending upon the pH of the environment. They form stable protonates on neutralization with suitable strong acids, for example, hydrochloric acid, sulfuric acid, phosphoric acid, perchloric acid, and the like. These acid addition salts are useful for upgrading or purifying the carboxyacylate free bases.

The novel compounds of this invention, including the free bases of Formula I, the acid addition salts thereof, the carboxyacylates of Formula II, and the acid addition salts thereof possess pharmacological activity. For example, they are orally and parenterally active in birds and mammals, including man, as antihypertensive agents having vasodilatory activity, and are useful for lowering blood pressure and for the treatment of shock. They are also useful as antiviral agents, as anti-inflammatory agents, and as central nervous system stimulants. These compounds also cause electrolyte and water retention in laboratory animals such as rats and dogs, and hence are useful to produce laboratory animals with larger than normal amounts of sodium ions, potassium ions, chloride ions, and water. Such animals are useful in pharmacological research, for example, in screening compounds for possible diuretic activity and in studying the action of known diuretics.

The novel 1,2-dihydro-1-hydroxypyrimidines of Formula I are produced by mixing a compound of the formula:

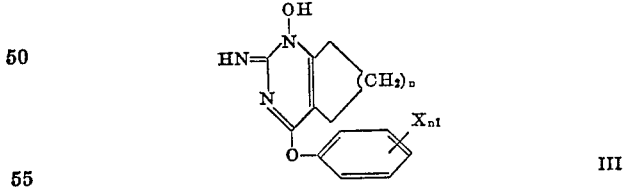

III wherein X is selected from the group consisting of fluorine, chlorine, and bromine, $n_1$ is zero to 3, inclusive, and $n$ is defined as above with an amine of the formula RH, wherein R is as defined above. The phenoxy moiety of the Formula III reactant is displaced by the R moiety of the amine.

The 1,2-dihydro-1-hydroxy-4-phenoxypyrimidines of Formula III are novel compounds. In addition to being useful as reactants for the production of Formula I 1,2-dihydro-1-hydroxypyrimidines, they are useful for various pharmacological purposes. For example, the Formula III compounds are orally and parenterally active in birds and mammals, including man, as antihypertensive agents having vasodilatory activity, and are useful for lowering blood pressure and for the treatment of shock. They are also useful as antiviral agents, and as agents causing electrolyte and water retention in laboratory animals.

The novel 1,2-dihydro-1-hydroxy-4-phenoxypyrimidines of Formula III are produced by mixing a novel pyrimidine of the formula:

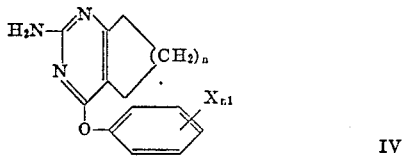

IV wherein X, n, and $n_1$ are as defined above, with a percarboxylic acid. Particularly preferred for this purpose are perbenzoic acids of the formula:

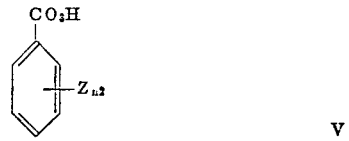

V wherein Z is selected from the group consisting of halogen, lower alkyl, lower alkoxy, and nitro, and $n_2$ is zero to 5, inclusive. However, other percarboxylic acids can be used for this oxidation, examples being performic acid, peracetic acid, perpropionic acid, perbutyric acid, perphthalic acid, percamphoric acid, and the like, particularly peracetic acid.

Pyrimidines of Formula IV are prepared by mixing a pyrimidine of the formula:

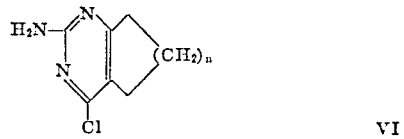

VI wherein $n$ is as defined above, with a phenoxide salt of a phenol of the formula:

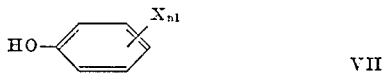

VII wherein X and $n_1$ are as defined above.

The compounds of Formula VI are known in the art. [See Hull et al., J. Chem. Soc. (London), 362 (1946).]

The reaction between a Formula VI 2-amino-4-chloropyrimidine and a phenoxide salt of the Formula VII phenol is carried out by heating a mixture of the pyrimidine and the salt in the range about 90° to about 150° C., preferably at about 100° C., until the desired displacement reaction takes place. Usually about one to about 5 hours of heating is sufficient, with about 3 hours being preferred when the reaction is carried out at about 100° C.

Alkali metal phenoxides, especially sodium potassium phenoxides, are preferred although phenoxides of other metals, e.g., magnesium, calcium, and aluminum, can be used. One molecular equivalent of the phenoxide salt is required to react with each molecular equivalent of 2-amino-4-chloropyrimidine, and there is usually no reason to use other than those molecular proportions. It is advantageous, however, to heat the phenoxide salt and the 2-amino-4-chloropyrimidine in the presence of about one to about 10 or even more molecular equivalents of the phenol corresponding to the phenoxide salt. The phenol then serves as a diluent, and can also serve as a source of the phenoxide salt. In the latter case, one molecular equivalent of a metal hydroxide corresponding to the desired metal phenoxide salt, e.g., sodium hydroxide or potassium hydroxide, is added to sufficient Formula VII phenol to produce the desired amount of phenoxide salt and leave enough to serve as the diluent.

In preparing the mixture of phenoxide salt and phenol diluent, it is often advantageous to add the metal hydroxide in solid form, and then remove water by a preliminary heating at about 100° C. The chloropyrimidine is then added to the phenoxide-phenol mixture.

Alternatively, chloropyrimidine, metal hydroxide, and sufficient phenol to form phenoxide and to serve as a diluent are mixed together and heated.

In place of or in addition to a phenol diluent, another inert liquid diluent, for example, dimethylformamide, can be used to aid in forming a suitably mobile reaction mixture.

The desired Formula IV 2-amino-4-phenoxypyrimidine can be isolated from the reaction mixture by conventional methods, for example, by addition of sufficient aqueous alkali metal hydroxide solution to dissolve the phenol diluent, if one is used, followed by separation of the desired product by filtration or centrifugation. The phenoxypyrimidine can then be purified, if desired, by conventional methods, for example, by recrystallization from a suitable solvent or mixture of solvents.

The reaction between a Formula IV 2-amino-4-phenoxypyrimidine and a percarboxylic acid to produce a Formula III 1,2-dihydro-1-hydroxy-4-phenoxypyrimidine is carried out by mixing those two reactants, preferably in the presence of an inert liquid diluent. Although, as mentioned above, percarboxylic acids generally are useful for this oxidation, it is preferred to use perbenzoic acids of Formula V. Acids of Formula V are known in the art or can be prepared by methods known in the art. See, for example, Braun, Organic Syntheses, Coll. vol. 1, 2nd ed., 431 (1941) and Silbert et al., J. Org. Chem. 27, 1336 (1962). In Formula V, when $n_2$ is 2 or more, the Z's can be the same or different. Examples of halogen are fluorine, chlorine, bromine, and iodine. Examples of lower alkyl are methyl, ethyl, propyl, butyl, pentyl, hexyl, heptyl, octyl, and isomeric forms thereof. Examples of lower alkoxy are methoxy, ethoxy, propoxy, butoxy, pentyloxy, hexyloxy, heptyloxy, octyloxy, and isomeric forms thereof. Illustrative oxidizing acids of Formula V include perbenzoic acid, o-, m-, and p-chloro- and bromoperbenzoic acids, 3,5-dichloroperbenzoic acid, 2,3,5,6-tetrachloroperbenzoic acid, 4-methylperbenzoic acid, 3,4-dimethylperbenzoic acid, pentamethylperbenzoic acid, o-, m-, and p-methoxyperbenzoic acids, 3-nitroperbenzoic acid, 2,4-dinitroperbenzoic acid, 3-chloro-4-methoxyperbenzoic acid, 3-chloro-4-nitroperbenzoic acid, and the like.

In carrying out the reaction between the Formula IV pyrimidine and the Formula V perbenzoic acid, and two reactants are mixed advantageously below about 50° C., preferably between about −10° and +10° C., although higher or lower temperatures can be used. It is preferred to mix the reactants in the presence of an inert liquid diluent and to stir the mixture until the reaction is substantially complete. The reaction usually requires about one to about 8 hours. Suitable diluents include N-loweralkylpyrrolidones, e.g., N-methylpyrrolidone; lower alkanols, e.g., methanol, ethanol, propanol, isopropyl alcohol, the butanols and the pentanols; lower alkanol and glycol esters of lower alkanoic acids, e.g., ethyl acetate, butyl acetate, pentyl acetate, ethylene glycol monoacetate, diethylene glycol monoacetate; acetone; ethers, e.g., diethyl ether, diisopropyl ether, ethylene glycol monoethyl ether, diethylene glycol monobutyl ether; and the like. The molecular ratio of Formula IV pyrimidine and Formula V perbenzoic acid can be varied widely. Ratios from about 1:1 to 1:5, preferably from about 1:1.5 to 1:2.5, are suitable.

When an aliphatic peracid, such as those given above, for example, peracetic acid, is used in place of the Formula V perbenzoic acid, the reaction is carried out at a temperature of from about 30° to 80° C., preferably at a temperature of 55° to 65° C., and for a period of from about 3 to 20 hours, preferably for 18 hours. The diluent is preferably the same acid (e.g., acetic acid) from which the peracid is formed (e.g., peracetic acid).

The 1,2-dihydro-1-hydroxy-4-phenoxypyrimidine of the Formula III can be isolated from the oxidation reaction mixture by conventional techniques, for example, by successive evaporation of the reaction solvent at reduced pressure, solution of the basic Formula III product in aqueous acid, e.g., hydrochloric acid, removal of undesired water-insoluble reaction products by filtration, neutralization of the acidic filtrate, and isolation of the Formula III product by filtration, extraction, or chromatography. The isolated material can be purified by conventional techniques, for example, by recrystallization from a suitable solvent or pair of solvents, or by preparation of an acid addition salt, e.g., the hydrochloride or acid phosphate, and recrystallization of the salt, followed, if desired, by reconversion of the salt to the free base in the usual manner.

The reaction between a Formula III 1,2-dihydro-1-hydroxy-4-phenoxypyrimidine and an amine of formula RH, wherein R is as defined above, to produce a Formula I 1,2-dihydro-1-hydroxypyrimidine is carried out by mixing those two reactants and heating the mixture in the range about 100° to about 200° C., preferably in the range about 125° to about 175° C. At least one molecular equivalent of the amine should be mixed with each molecular equivalent of the pyrimidine reactant. It is usually advantageous to use an excess of the amine, for example, about 2 to about 20 molecular equivalents or even more of amine per molecular equivalent of the pyrimidine, the excess amine then acting as a diluent. An inert organic diluent can also be present in the reaction mixture. Especially suitable for that purpose are dialkylformamides, particularly those where the dialkyl substituents are the same as those on the displacing amine, and alkanols.

When the reactant amine has a relatively low boiling point and is likely to escape from the reaction vessel during heating, it is advantageous to use a closed reaction vessel, for example, a heavy-wall, sealed, glass tube or a closed metal autoclave for the heating step.

A reaction time of about one to about 20 hours is usually required. The desired displacement reaction usually takes place more rapidly at higher temperatures than at lower. Moreover, when the phenoxy moiety has 2 or 3 halogen substituents, i.e., when $n_1$ in Formula III is 2 or 3, the displacement usually takes place more rapidly and at a lower temperature than when fewer or no halogen is present. In the latter instances, especially when no halogen is present in the phenoxy moiety, the displacement reaction is often accelerated by adding sodium or potassium metal to the reaction mixture. Preferably, about one atomic equivalent of the alkali metal is added per molecular equivalent of the pyrimidine reactant. Addition of a catalytic amount of a Lewis acid such as ferric chloride with the alkali metal will also often accelerate the displacement reaction or make feasible a lower reaction temperature. About 0.01 to 0.001 molecular equivalents of ferric chloride per atomic equivalent of alkali metal is usually a suitable catalytic amount.

Examples of suitable primary amine reactants for this displacement reaction are methylamine, ethylamine, propylamine, isopropylamine, butylamine, sec-butylamine, pentylamine, isopentylamine, hexylamine, heptylamine, octylamine, allylamine, 2-methylallylamine, 2-butenylamine, 3-butenylamine, 3-pentenylamine, 4-hexenylamine, 4,4-dimethyl-2-pentenylamine, cyclobutylamine, cyclohexylamine, 4-tert-butylcyclohexylamine, benzylamine, phenethylamine, and the like. Examples of suitable secondary amines for this purpose are dimethylamine, diethylamine, N-methylethylamine, dipropylamine, N-ethylisopropylamine, di-sec-butylamine, N-methylbutylamine, dipentylamine, N - ethyl-2,4-dimethylpentylamine, N-methyloctylamine, diheptylamine, diallylamine, N-methylallylamine, di - (1 - methylallyl)amine, di - (2-methylallyl)amine, N-ethyl-1-methylallylamine, N-propyl-2-ethylallylamine, di-(2-pentenyl)amine, di-(3-butenyl)amine, di - (4-hexenyl)amine, N-butyl-2-butenylamine, N-methylcyclohexylamine, dicyclohexylamine, N-ethylbenzylamine, dibenzylamine, di-(4-methyl-3-hexenyl)amine, aziridine, 2-methylaziridine, 2,2-dimethylaziridine, azetidine, 2-ethylazetidine, 3-octylazetidine, 3,3-dimethylazetidine, 2,2,4-trimethylazetidine, pyrrolidine, 2-propylpyrrolidine, 3-butylpyrrolidine, 2-isohexylpyrrolidine, 2,3-dimethylpyrrolidine, 2,2,4-trimethylpyrrolidine, 2,5-diethylpyrrolidine, 3,4-dioctylpyrrolidine, piperidine, 2-methylpiperidine, 3-ethylpiperidine, 4-butylpiperidine, 2,4,6-trimethylpiperidine, 2-methyl-5-ethylpiperidine, 3,5-dipentylpiperidine, hexahydroazepine, 2-ethylhexahydroazepine, 4-tert-butylhexahydroazepine, 3,3-dimethylhexahydroazepine, 2,4,6-tripropylhexahydroazepine, heptamethylenimine, 2-methylheptamethylenimine, 2,4-diisopropylheptamethylenimine, octamethylenimine, 4-isooctyloctamethylenimine, morpholine, 2-ethylmorpholine, 2-methyl-5-ethylmorpholine, 2,6-dimethylmorpholine, N-methylpiperazine, and the like.

The desired Formula I 1,2-dihydro-1-hydroxypyrimidine can usually be isolated from the reaction mixture in free base form by cooling the reaction mixture to about 0° to about 25° C. The free base form usually precipitates and can be isolated by conventional techniques, for example, by filtration or centrifugation. Alternatively, excess amine and other diluent, if one is used, can be removed by distillation or evaporation, and the desired 1,2-dihydro - 1-hydroxypyrimidine isolated by conventional techniques, for example, fractional recrystallization or extraction. The isolated pyrimidine can then be purified, if desired, by conventional techniques, for example, recrystallization from a suitable solvent or mixture of solvents, or by chromatography. Alternatively, an acid addition salt, e.g., the hydrochloride or acid phosphate of the pyrimidine product can be prepared, purified by recrystallization, and then, if desired, reconverted to the free base in the usual manner.

The 1,2-dihydro-1-hydroxypyrimidines of Formula I are transformed to monoacid and diacid addition salts by neutralization with appropriate amounts of the corresponding inorganic or organic acid, examples of which are given above. These transformations can be carried out by a variety of procedures known to the art to be generally useful for the preparation of amine acid addition salts. The choice of the most suitable procedure will depend on a variety of factors including convenience of operation, economic considerations, and particularly the solubility characteristics of the Formula I amine, the acid, and the acid addition salt. If the acid is soluble in water, the basic compound of Formula I can be dissolved in water containing either one or two equivalent amounts of the acid, and thereafter, the water can be removed by evaporation. If the acid is soluble in a relatively non-polar solvent, for example, diethyl ether or diisopropyl ether, separate solutions of the acid and the basic Formula I compound in such a solvent can be mixed in equivalent amounts, whereupon the acid addition salt will usually precipiatte because of its relatively low solubility in the non-polar solvent. Alternatively, the basic Formula I compound can be mixed with the acid in the presence of a solvent of moderate polarity, for example, a lower alkanol, a lower alkanone, or a lower alkyl ester of a lower alkanoic acid. Examples of these solvents are ethanol, acetone, and ethyl acetate, respectively. Subsequent admixture of the resulting solution of acid addition salt with a solvent of relatively low polarity, for example, diethyl ether or hexane, will usually cause precipitation of the acid addition salt. Either monoacid or diacid salts can be formed by using one or two equivalents, respectively, of the acid.

Acid addition salts of the Formula I pyrimidines can be transformed to other acid addition salts by a metathetical exchange of the original acid addition salt anion, e.g., the chloride ion, with another anion, for example, as described above with regard to the formation of penicillin salts.

The carboxyacylates of Formula II are produced by mixing a Formula I 1,2-dihydro-1-hydroxypyrimidine with the appropriate amount of a carboxyacylating agent, preferably in the presence of a diluent.

Although substantially any carboxyacylating agent can be used to produce these carboxyacylates, especially suitable are the anhydrides, mixed anhydrides, and acid chlorides of alkanoic, cycloalkanoic, alkenoic, cycloalkenoic, aralkanoic, aromatic, and heterocyclic carboxylic acids. These anhydrides and acid chlorides can also be substituted on any carbon but the carbonyl carbon with any of a wide variety of atomic or molecular moieties unreactive with the dihydropyrimidine reactants. Examples of such substituents are alkyl, e.g., methyl, butyl, decyl; alkoxy, e.g., methoxy, ethoxy, pentyloxy; alkylthio, e.g., methylthio, propylthio, heptylthio; dialkylamino, e.g., dimethylamino, diethylamino, dihexylamino; alkoxycarbonyl, e.g., methoxycarbonyl, propoxycarbonyl, nonoxycarbonyl; carboxyacyl, e.g., acetyl, butyryl; carboxamido, e.g., benzamido, acetamido; nitro; fluoro; cyano; and the like. Chlorine, bromine, and iodine can also be substituents on aromatic portions of the carboxyacylating agents.

Examples of suitable anhydrides are acetic anhydride, propionic anhydride, butyric anhydride, isobutyric anhydride, acrylic anhydride, crotonic anhydride, cyclohexanecarboxylic anhydride, benzoic anhydride, naphthoic anhydride, furoic anhydride, and the like, as well as the corresponding anhydrides substituted with one or more of the above-mentioned substituents. Examples of suitable acid chlorides are acetyl chloride, propionyl chloride, butyryl chloride, isobutyryl chloride, decanoyl chloride, acryloyl chloride, crotonoyl chloride, cyclohexanecarbonyl chloride, 3-cyclohexenecarbonyl chloride, phenylacetyl chloride, succinyl chloride, benzoyl chloride, naphthoyl chloride, furoyl chloride, 3-pyridinecarbonyl chloride, phthaloyl chloride, and the like, as well as the corresponding acid chlorides substituted with one or more of the above-mentioned substituents. At least one molecular equivalent of carboxyacylating agent should be used for the introduction of the carboxyacyl moiety.

The carboxyacylation usually takes place rapidly in the range about $-20°$ to about $+50°$ C. Suitable diluents are ethers, e.g., diethyl ether and tetrahydrofuran; ketones, e.g., acetone and methyl ethyl ketone; esters, e.g., methyl acetate and ethyl acetate; acetonitrile; pyridine; chloroform, and the like. The carboxyacylate often separates from the reaction mixture in crystalline form, and can be separated in the usual manner, for example, by filtration or centrifugation. Alternatively, the diluent can be evaporated, preferably at reduced pressure. The carboxyacylates can be purified by conventional techniques, for example, by recrystallization from a suitable solvent or mixture of solvents.

Dihydropyrimidine carboxyacylates prepared as described above are easily transformed back to the Formula I dihydropyrimidine free base, preferably by warming with a lower alkanol, e.g., methanol or ethanol. Simultaneous treatment with a base, for example, gaseous ammonia, or an acid, for example, hydrochloric acid, usually accelerates the alcoholysis.

As mentioned above, the novel compounds of this invention, i.e., compounds of Formulas I, II, and III including the free bases and acid addition salts thereof, are useful as antihypertensive agents, anti-viral agents, anti-inflammatory agents, and as central nervous system stimulants in the treatment of birds and mammals, including man. For those purposes, especially as anti-hypertensive agents, said novel compounds can be used in the non-protonated (free base) form or in the protonated (acid addition salt) form either in association with a pharmaceutical carrier in solid or liquid dosage forms, such as tablets, capsules, powders, pills, granules, syrups, elixirs, suppositories, sterile aqueous or vegetable oil dispersions for parenteral use, and the like, alone or in combination with other drugs, for example, in combination with diuretics, sympathetic blocking agents, ganglion-blocking agents, peripheral vasodilators, reserpinoids, tranquilizers, sedatives, muscle relaxants, antihistamines and other antihypertensives.

Powders are prepared by comminuting the active ingredient to a suitable fine size and mixing with a similarly comminuted diluent. The diluent can be an edible carbohydrate material such as starch. Advantageously, a sweetening agent is present as well as a flavoring agent.

Capsules are produced by preparing a powder mixture as hereinbefore described and filling into formed gelatin sheets. Advantageously, as an adjuvant to the filling operation, a lubricant such as talc, magnesium stearate and calcium stearate is added to the powder mixture before the filling operation.

Tablets are made by preparing a powder mixture, granulating or slugging, adding a lubricant and pressing into tablets. The powder mixture is prepared by mixing the active ingredient suitably comminuted, with a diluent or base such as starch, lactose, kaolin, dicalcium phosphate, calcium sulfate, and the like. The powder mixture can be granulated by wetting with a binder such as syrup, gelatin solution, methylcellulose solution or acacia mucilage and forcing through a screen. As an alternative to wet granulating, the powder mixture can be slugged, i.e., run through a tablet machine and the resulting large tablets broken down into granules. The granules are further lubricated to prevent sticking to the tablet-forming dies by means of the addition of stearic acid, a stearate salt, talc, or mineral oil. The lubricated mixture is then compressed into tablets.

Advantageously, the tablet can be provided with a protective coating consisting of a sealing coat of shellac, a coating of sugar and methylcellulose, and a polish coating of carnauba wax.

Oral fluids are prepared in unit dosage forms such as syrups and elixirs wherein each teaspoonful of composition contains a predetermined amount of active ingredient for administration.

A syrup is prepared by dispersing the active ingredient in a suitably flavored aqueous sucrose solution. Similarly an elixir is prepared utilizing an aqueous-alcoholic vehicle. Elixirs are advantageous vehicles for use when a therapeutic agent, which is not sufficiently water-soluble, is in the composition.

For parenteral administration aqueous fluid unit dosage forms can be prepared. In preparing the parenteral form, a measured amount of active ingredient is placed in a vial, and the vial and its contents are sterilized and sealed. An accompanying vial of sterile water for injection is provided as a vehicle to form a dispersion prior to administration. Advantageously, the sterile water can have dissolved therein a local anesthetic and buffering agent. Parenteral aqueous solutions can also be made by utilizing a pharmacologically acceptable salt of the active ingredient, such as those mentioned above.

Alternatively, a parenteral suspension can be prepared by suspending the active ingredient in a parenterally acceptable vegetable oil with or without additional adjuvants, and sterilizing after filling into vials.

For veterinary oral use the active ingredient is conveniently prepared in the form of a food premix. The food premix can comprise the active ingredient in admixture with an edible pharmaceutical diluent such as starch, oatmeal, flour, calcium carbonate, talc, dried fish meal, and the like. The prepared premix is then conveniently added to the regular feed, thereby providing medication to the animal in the course of feeding.

The term "unit dosage form" as used in the specification and claims refers to physically discrete units suitable as unitary dosages for human subjects and animals, each unit containing a predetermined quantity of active material calculated to produce the desired therapeutic effect in association with the required pharmaceutical diluent, carrier or vehicle. The specifications for the novel unit dosage forms of this invention are dictated by and directly dependent on (a) the unique characteristics of the active material and the paritcular therapeutic effect to be achieved, and (b) the limitations inherent in the art of compounding such active material for therapeutic use in humans and animals, as disclosed in detail in the specification, these being features of the present invention. Examples of suitable unit dosage forms in accord with this invention are tablets, capsules, pills, powder packets, granules, wafers, cachets, suppositories, segregated multiples of any of the foregoing, and other forms as herein described.

The amount of active ingredient that is to be administered depends on the age, weight of the patient, the particular condition to be treated, the frequency of administration, and the route of administration. The dose range is from about 0.1 to about 30 mg. per kg. of body weight, preferably about 0.3 to about 10 mg. per kg. of body weight. The human dose ranges from about 5 to about 500 mg. daily given as a single dose or in 3 or 4 divided doses; preferably, the adult dose is from 25 to about 200 mg. Veterinary dosages will correspond to human dosages with amounts administered being in proportion to the weight of the animal as compared to adult humans.

The active ingredient is compounded with a suitable pharmaceutical diluent in unit dosage form, either alone or in combination with other active ingredients. The amount of such other active ingredients is to be determined with reference to the usual dosage of each such ingredient. Thus the novel compounds of the invention can be combined with other hypotensive agents such as α-methyldopa 100–250 mg.; with diuretics such as aminophylline 100–200 mg. bendroflumethiazide 2.5–5 mg., hydrochlorothiazide 10–50 mg., trichlormethiazide 2–4 mg., triamterene 25–100 mg., ethoxzolamide 50–250 mg., amisometradine 200–400 mg., spironolactone 25–100 mg.; sympathetic blocking agents such as guanethidine sulfate 10–50 mg., bethanidine sulfate 5–20 mg.; ganglion-blocking agents such as pentolinium bitartrate 20–200 mg., mecamylamine hydrochloride 2.5–5 mg., hexamethonium chloride 125–250 mg., chlorisondamine chloride 25–100 mg.; peripheral vasodilators such as hydralazine 10–100 mg., beta-pyridyl carbinol 50–150 mg., mebutamate 100–300 mg.; reserpine type drugs such as reserpine 0.1–1 mg., alseroxylon 2–4 mg., syrosingopine 0.5–2 mg., deserpidine 0.1–1 mg.; tranquilizers such as meprobamate 200–400 mg., ectylurea 100–300 mg., chlordiazepoxide hydrochloride 5–20 mg., promazine hydrochloride 25–150 mg., diazepan 2–10 mg.; sedatives such as phenobarbital 8–60 mg., methyprylon 50–100 mg., amobarbital 20–40 mg., ethchlorvynol 100–200 mg.; muscle relaxants such as papaverine hydrochloride 20–100 mg., carisoprodol 200–400 mg., phenaglycodol 200–400 mg.

The following examples illustrate the best mode contemplated by the inventors for carrying out their invention:

EXAMPLE 1

*1,2 - dihydro-1-hydroxy-2-imino-5,6-trimethylene-4-piperidinopyrimidine and acid addition salts and carboxyacylates thereof*

PART A.—2-AMINO-5,6-TRIMETHYLENE - 4-(2,4-DICHLOROPHENOXY)PYRIMIDINE

A mixture of 39 g. (0.24 mole) of 2,4-dichlorophenol, 4.0 g. (0.06 mole) of 85% potassium hydroxide and 10.0 g. (0.06 mole) of 2-amino-5,6-trimethylene-4-chloropyrimidine was heated at 90–100° C. for 2.5 hours. A solution of 18.0 g. (0.15 mole) of 85% potassium hydroxide and 150 ml. of water was added, followed by stirring until the mixture reached 25° C. The mixture was then filtered and the solid thus-obtained washed thoroughly with water and recrystallized from about 500 ml. of 75% ethanol to yield 13.5 g. (76% of theory) of 2-amino - 5,6 - trimethylene - 4-(2,4-chlorophenoxy)pyrimidine; M.P. 180–182° C.

*Analysis.*—Calcd. for $C_{13}H_{11}N_3OCl_2$: C, 52.72; H, 3.74; N, 14.19; Cl, 23.94. Found: C, 52.94; H, 4.03; N, 14.03; Cl, 24.03.

U.V. (ethanol) sh 220 mμ($\epsilon$=18,530); 276 mμ($\epsilon$=19,189); sh 275 mμ($\epsilon$=5350); 286 mμ($\epsilon$=7550).

(0.01 N $H_2SO_4$) sh 219 mμ($\epsilon$=28,890); sh 225 mμ($\epsilon$=21,625); sh 260 mμ($\epsilon$=2665); sh 283 mμ($\epsilon$=7650); 294 mμ($\epsilon$=8820).

(0.01 N NaOH) 227 mμ($\epsilon$=17,375); sh 277 mμ($\epsilon$=5830); 286 mμ($\epsilon$=7605).

I.R. (principal bands; mineral oil mull) 3340, 3280, 3180, 3080, 1640, 1605, 1590, 1555, 1495, 1230, 1170, 1135, 1095, 1025, 830, 780, 755 cm.$^{-1}$.

Following the procedure of Example 1, part A, but using in place of the 2,4-dichlorophenol, phenol; p-chlorophenol; p-bromophenol; 2,4-dibromophenol; and m-fluorophenol; and the like, there are obtained 2-amino-5,6-trimethylene-4-phenoxypyrimidine; 2-amino-5,6 - trimethylene-4-(p-chlorophenoxy)pyrimidine; 2-amino - 5,6 - trimethylene - 4 - (p - bromophenoxy)pyrimidine; 2-amino-5,6 - trimethylene - 4 - (2,4 - dibromophenonxy)pyrimidine; and 2-amino-5,6-trimethylene-4-(m-fluorophenoxy)pyrimidine; and the like, respectively.

PART B.—1,2-DIHYDRO - 1 - HYDROXY-2-IMINO-5,6-TRIMETHYLENE-4-(2,4-DICHLOROPHENOXY)PYRIMIDINE (1) A solution of 12.0 g. (0.04 mole) of 2-amino-5,6-trimethylene-4 - (2,4 - dichlorophenoxy)pyrimidine, 0.06 mole of peracetic acid and 100 ml. of acetic acid was heated at 58° C. for 20 hours. The thus-obtained solution was concentrated to a syrup at 58° C. under reduced pressure, diluted with 200 ml. water, shaken and decanted. The residue was then shaken with an additional 200 ml. of water, filtered and recrystallized from a small volume of acetonitrile to yield 3.0 g. (24% of theory) of 1,2-dihydro-1-hydroxy-2-imino-5,6-trimethylene-4 - (2,4 - dichlorophenoxy)pyrimidine; M.P. 193–194° C.

*Analysis.*—Calcd. for $C_{13}H_{11}N_3O_2Cl_2$: C, 50.02; H, 3.55; N, 13.46; O, 10.25; Cl, 22.72. Found: C, 49.68; H, 3.46; N, 12.64; O, 9.70; Cl, 22.35.

U.V. (ethanol) 221 mμ($\epsilon$=28,390); 256 mμ($\epsilon$=8485); 283 mμ($\epsilon$=2480); 319 mμ($\epsilon$=8390).

(0.01 N $H_2SO_4$) sh 226 mμ($\epsilon$=10,905); 259 mμ($\epsilon$=3495); 283 mμ($\epsilon$=5950); 299 mμ($\epsilon$=7490).

(0.01 N NaOH) 222 mμ($\epsilon$=27,985); 256 mμ($\epsilon$=8985); 282.5 mμ($\epsilon$=2495); 318 mμ($\epsilon$=8735).

(2) A mixture of 14.5 g. (0.048 mole) of 2-amino-5,6 - trimethylene - 4 - (2,4 - dichlorophenoxy)pyrimidine, 200 ml. of ethanol and 460 ml. of ethylene glycol was heated until the solution was clear, quickly cooled to 0° C. and 11.9 g. (0.075 mole) of m-chloroperbenzoic acid was added over a 1.5 hour period. The thus-obtained reaction mixture was stirred at 0–5° C. for 4 hours, poured into a solution of 5.0 g. of potassium hydroxide and 1000 ml. of water, allowed to stand for 18 hours, and filtered. The solid was recrystallized from 700 ml. of acetonitrile to yield 6.0 g. (40% of theory) of 1,2-dihydro-1-hydroxy-2-imino-5,6-trimethylene-4 - (2,4-dichlorophenoxy)pyrimidine; M.P. 194–195° C.

Following the procedure of Example 1, part B(2), but using in place of the m-chloroperbenzoic acid, in separate experiments, perbenzoic acid; perphthalic acid; 2,4-dichloroperbenzoic acid; p-methylperbenzoic acid; m-nitroperbenzoic acid, and p-methoxyperbenzoic acid, the same product, 1,2-dihydro-1-hydroxy-2-imino-5,6-trimethylene-4-(2,4-dichlorophenoxy)pyrimidine, is obtained.

Also following the procedure of Example 1, parts B(1) and (2), but using in place of the 2-amino-5,6-trimethylene-4-(2,4-dichlorophenoxy)pyrimidine, 2 - amino - 5,6-trimethylene - 4 - phenoxypyrimidine; 2 - amino - 5,6-trimethylene-4 - (p - chlorophenoxy)pyrimidine; 2 - amino-5,6 - trimethylene - 4 - (p - bromophenoxy)pyrimidine; 2 - amino - 5,6 - trimethylene - (2,4 - dibromophenoxy)pyrimidine; and 2 - amino - 5,6 - trimethylene - 4 - (m-fluorophenoxy)pyrimidine, and the like, there are obtained 1,2 - dihydro - 1 - hydroxy - 2 - imino - 5,6 - trimethylene-4 - phenoxypyrimidine; 1,2 - dihydro - 1 - hydroxy - 2- imino - 5,6 - trimethylene - 4 - (p - chlorophenoxy)pyrimidine; 1,2 - dihydro - 1 - hydroxy - 2 - imino - 5,6 - trimethylene - 4 - (p - bromophenoxy) pyrimidine; 1,2 - dihydro-1 - hydroxy - 2 - imino - 5,6 - trimethylene - 4 - (2,4-dibromophenoxy)pyrimidine; and 1,2-dihydro-1-hydroxy-2-imino-5,6-trimethylene-4 - (m - fluorophenoxy)pyrimidine, and the like, respectively.

Addition of absolute ethanol containing one equivalent of hydrogen chloride to an absolute ethanol solution of 1,2 - dihydro - 1 - hydroxy - 2 - imino - 5,6 - trimethylene-4 - (2,4 - dichlorophenoxy)pyrimidine, or the other 1,2-dihydro - 1 - hydroxy - 2 - imino - 5,6 - trimethylene - 4-substituted-pyrimidines given in Example 1, part B, followed by addition of about 4 volumes of diethyl ether, gives the corresponding 1,2-dihydro-1-hydroxypyrimidine hydrochloride. Similar separate use of benzoic acid, lactic acid, maleic acid, phosphoric acid, sulfuric acid, and succinic acid gives the corresponding 1,2-dihydro-1-hydroxypyrimidine acid addition salts.

PART C.—1,2-DIHYDRO - 1 - HYDROXY-2-IMINO-5,6-TRIMETHYLENE-4-PIPERIDINOPYRIMIDINE

A mixture of 1.2 g. (0.0038 mole) of 1,2-dihydro-1-hydroxy-2-imino-5,6-trimethylene - 4 - (2,4-dichlorophenoxy)pyrimidine and 10 ml. of piperidine was heated at an oil bath temperature of 148° C. for 2.5 hours. The reaction mixture was allowed to cool slowly to 25° C., filtered, and the solid obtained was washed with piperidine, followed by ether, to yield 0.5 g. (56% of theory) of 1,2-dihydro-1-hydroxy-2-imino - 5,6-trimethylene - 4-piperidinopyrimidine; M.P. 206–209° C.

Analysis.—Calcd. for $C_{12}H_{18}N_4O$: C, 61.51; H, 7.74; N, 23.91. Found: C, 60.99; H, 8.16; N, 22.39.

U.V. (ethanol) 214 m$\mu$($\epsilon$=19,400); 268 m$\mu$($\epsilon$=9665); 325 m$\mu$($\epsilon$=9520).
(0.01 N $H_2SO_4$) 214 m$\mu$($\epsilon$=20,360); 255 m$\mu$($\epsilon$=11,325); sh 288 m$\mu$($\epsilon$=11,325); 296 m$\mu$($\epsilon$=12,565); sh 307 m$\mu$($\epsilon$=9045).
(0.01 N NaOH) 268 m$\mu$($\epsilon$=12,565); 324 m$\mu$($\epsilon$=12,050).
I.R. (principal bands; mineral oil mull) 3410, 3330, 2730, 2670, 1645, 1585, 1550, 1475, 1260, 1210, 1165, 1115, 1045, 1025 cm.$^{-1}$.

Addition of absolute ethanol containing one equivalent of hydrogen chloride to an absolute ethanol solution of 1,2-dihydro-1-hydroxy - 2 - imino-5,6-trimethylene - 4-piperidinopyrimidine, followed by addition of about 4 volumes of diethyl ether, gives the corresponding monohydrochloride. Similar use of 2 equivalents of hydrogen chloride gives the corresponding dihydrochloride. Similar separate use of benzoic acid, lactic acid, succinic acid, maleic acid, sulfuric acid, and phosphoric acid gives the corresponding 1,2-dihydro-1-hydroxypyrimidine acid addition salts.

Following the procedure of Example 1, part C, but using in place of the piperidine, dimethylamine; diethylamine; dibutylamine; N-methylbutylamine; N-ethylhexylamine; butylamine; octylamine; diallylamine; dicrotylamine; di-(2-hexenyl)amine; N-methyl-allylamine; allylamine; 2-octenylamine; dibenzylamine; diphenethylamine; N - methylbenzylamine; N - ethyl - (1 - naphthylmethyl) amine; benzylamine; 3-phenylpropylamine; cyclohexylamine; dicyclohexylamine; cyclobutylamine; N-methyl-(4-tert - butylcyclohexyl)amine; azetidine; pyrrolidine; 2-methylpyrrolidine; 3-ethylpyrrolidine; 2,5-dimethylpyrrolidine; 2-methyl-5-ethylpiperidine; 3-isopropylpiperidine; 2,4,6 - trimethylpiperidine; hexahydroazepine; 4 - tert-butylhexahydroazepine; heptamethylenimine; octamethylenimine; morpholine; 2-ethylmorpholine; and N-methylpiperazine, and the like, there are obtained:

1,2-dihydro-1-hydroxy-2-imino-5,6-trimethylene-4-dimethylaminopyridimine,
1,2-dihydro-1-hydroxy-2-imino-5,6-trimethylene-4-diethylaminopyrimidine,
1,2-dihydro-1-hydroxy-2-imino-5,6-trimethylene-4-dibutylaminopyrimidine,
1,2-dihydro-1-hydroxy-2-imino-5,6-trimethylene-4-(N-methylbutylamino)pyrimidine,
1,2-dihydro-1-hydroxy-2-imino-5,6-trimethylene-4-(N-ethylhexylamino)pyrimidine,
1,2-dihydro-1-hydroxy-2-imino-5,6-trimethylene-4-butylaminopyrimidine,
1,2-dihydro-1-hydroxy-2-imino-5,6-trimethylene-4-octylaminopyrimidine,
1,2-dihydro-1-hydroxy-2-imino-5,6-trimethylene-4-diallylaminopyrimidine,
1,2-dihydro-1-hydroxy-2-imino-5,6-trimethylene-4-dicrotylaminopyrimidine,
1,2-dihydro-1-hydroxy-2-imino-5,6-trimethylene-4-[di-2(-hexenyl)amino]pyrimidine,
1,2-dihydro-1-hydroxy-2-imino-5,6-trimethylene-4-(N-methylallylamino)pyrimidine,
1,2-dihydro-1-hydroxy-2-imino-5,6-trimethylene-4-allylaminopyrimidine,
1,2-dihydro-1-hydroxy-2-imino-5,6-trimethylene-4-(2-octenylamino)pyrimidine,
1,2-dihydro-1-hydroxy-2-imino-5,6-trimethylene-4-dibenzylaminopyrimidine,
1,2-dihydro-1-hydroxy-2-imino-5,6-trimethylene-4-diphenethylaminopyrimidine,
1,2-dihydro-1-hydroxy-2-imino-5,6-trimethylene-4-(N-methylbenzylamino)pyrimidine,
1,2-dihydro-1-hydroxy-2-imino-5,6-trimethylene-4-[N-ethyl-(1-naphthylmethyl)amino]pyrimidine,
1,2-dihydro-1-hydroxy-2-imino-5,6-trimethylene-4-benzylaminopyrimidine,
1,2-dihydro-1-hydroxy-2-imino-5,6-trimethylene-4-(3-phenylpropylamino)pyrimidine,
1,2-dihydro-1-hydroxy-2-imino-5,6-trimethylene-4-cyclohexylaminopyrimidine,
1,2-dihydro-1-hydroxy-2-imino-5,6-trimethylene-4-dicyclohexylaminopyrimidine,
1,2-dihydro-1-hydroxy-2-imino-5,6-trimethylene-4-cyclobutylaminopyrimidine,
1,2-dihydro-1-hydroxy-2-imino-5,6-trimethylene-4-[N-methyl-(4-tert-butylcyclohexyl)amino]pyrimidine,
1,2-dihydro-1-hydroxy-2-imino-5,6-trimethylene-4-(1-azetidinyl)pyrimidine,
1,2-dihydro-1-hydroxy-2-imino-5,6-trimethylene-4-(1-pyrrolidinyl)pyrimidine,
1,2-dihydro-1-hydroxy-2-imino-5,6-trimethylene-4-[1-(2-methylpyrrolidinyl)]pyrimidine,
1,2-dihydro-1-hydroxy-2-imino-5,6-trimethylene-4-[1-(3-ethylpyrrolidinyl)]pyrimidine,
1,2-dihydro-1-hydroxy-2-imino-5,6-trimethylene-4-[1-(2,5-dimethylpyrrolidinyl)]pyrimidine,
1,2-dihydro-1-hydroxy-2-imino-5,6-trimethylene-4-(2-methyl-5-ethylpiperidino)pyrimidine,
1,2-dihydro-1-hydroxy-2-imino-5,6-trimethylene-4-(3-isopropylpiperidino)pyrimidine,
1,2-dihydro-1-hydroxy-2-imino-5,6-trimethylene-4-(2,4,6-trimethylpiperidino)pyrimidine,
1,2-dihydro-1-hydroxy-2-imino-5,6-trimethylene-4-(1-hexahydroazepinyl)pyrimidine,
1,2-dihydro-1-hydroxy-2-imino-5,6-trimethylene-4-[1-(4-tert-butylhexahydroazepinyl)]pyrimidine,
1,2-dihydro-1-hydroxy-2-imino-5,6-trimethylene-4-heptamethyleniminopyrimidine,
1,2-dihydro-1-hydroxy-2-imino-5,6-trimethylene-4-octamethyleniminopyrimidine,
1,2-dihydro-1-hydroxy-2-imino-5,6-trimethylene-4-morpholinopyrimidine,
1,2-dihydro-1-hydroxy-2-imino-5,6-trimethylene-4-(2-ethylmorpholino)pyrimidine,
1,2-dihydro-1-hydroxy-2-imino-5,6-trimethylene-4-(4-methyl-1-piperazinyl)pyrimidine, and the like, respectively.

Following the procedure of Example 1, part C, each of the above-mentioned specific 1,2-dihydro-1-hydroxypyrimidines is transformed to the corresponding hydrochloric acid, benzoic acid, lactic acid, maleic acid, phosphoric acid, sulfuric acid, and succinic acid addition salts.

Also following the procedure of Example 1 but using in place of the piperidine, each of the primary and secondary amines corresponding to each of the specific examples of

and heterocyclic moieties within the scope of R as defined and given above, there are obtained the corresponding 1,2 - dihydro - 1 - hydroxy - 2 - imino - 5,6 - trimethylenepyrimidines, substituted at the 4-position with a mono-substituted or disubstituted, including heterocyclic, amino moiety.

PART D.—1,2-DIHYDRO-1-HYDROXY-2-ACETYLIMINO-5,6-TRIMETHYLENE-4-PIPERIDINOPYRIMIDINE

A mixture of 1,2-dihydro-1-hydroxy-2-imino-5,6-trimethylene-4-piperidinopyrimidine (4.1 g.), acetic anhydride (4.0 ml.), and diethyl ether (200 ml.) is stirred at 25° C. for 60 hours. The solid which forms is filtered and washed with ether to give a solid which is recrystallized from 400 ml. of dimethylformamide to give 1,2-dihydro - 1 - hydroxy - 2 - acetylimino - 5,6 - trimethylene-4-piperidinopyrimidine.

Following the procedure of Example 1, part D, but using acetyl chloride in place of the acetic anhydride, the same product is obtained. Also following the procedure of Example 1, part D, but using in place of the acetic anhydride, propionic anhydride; crotonic anhydride; cyclohexanecarboxylic anhydride; isobutryl chloride; decanoyl chloride; phenylacetyl chloride; 3-methoxybutyric anhydride; p-tert-butylcyclohexanecarbonyl chloride; and p-nitrophenylacetyl chloride, there are obtained:

1,2-dihydro-1-hydroxy-2-propionylimino-5,6-trimethylene-4-piperidinopyrimidine,
1,2-dihydro-1-hydroxy-2-crotonylimino-5,6-trimethylene-4-piperidinopyrimidine,
1,2-dihydro-1-hydroxy-2-cyclohexanecarbonylimino-5,6-trimethylene-4-piperidinopyrimidine,
1,2-dihydro-1-hydroxy-2-isobutyrylimino-5,6-trimethylene-4-piperidinopyrimidine,
1,2-dihydro-1-hydroxy-2-decanoylimino-5,6-trimethylene-4-piperidinopyrimidine,
1,2-dihydro-1-hydroxy-2-phenylacetylimino-5,6-trimethylene-4-piperidinopyrimidine,
1,2-dihydro-1-hydroxy-2-(3-methoxybutyrylimino)-5,6-trimethylene-4-piperidinopyrimidine,
1,2-dihydro-1-hydroxy-2-(p-tert-butylcyclohexanecarbonylimino)-5,6-trimethylene-4-piperidinopyrimidine, and
1,2-dihydro-1-hydroxy-2-(p-nitrophenylacetylimino)-5,6-trimethylene-4-piperidinopyrimidine, respectively.

Also following the procedure of Example 1, part D, but using in place of the 1,2-dihydro-1-hydroxy-2-imino-5,6-trimethylene-4-piperidinopyrimidine, each of the above-mentioned 1,2-dihydro-1-hydroxy-2-imino-5,6-trimethylenepyrimidines substituted at the 4-position with a mono-substituted or disubstituted including heterocyclic amino moiety or with a phenoxy or halophenoxy moiety, there are obtained the corresponding 1,2-dihydro-1-hydroxy-2-acetylimino-5,6-trimethylenepyrimidines substituted at the 4-position as in the reactant.

Also following the procedure of Example 1, part D, but using in place of the combination of the 1,2-dihydro-1-hydroxy-2-imino-5,6 - trimethylene-4-piperidinopyrimidine and the acetic anhydride, each of the above-mentioned 1,2-dihydro-1-hydroxy-2 - imino-5,6-trimethylenepyrimidines, variously substituted at the 4-position as above-described and each of the above-mentioned carboxylic acid anhydrides and each of the above-mentioned carboxylic acid chlorides, there are obtained the corresponding 1,2-dihydro-1-hydroxy-2-carboxyacylimino-5,6-trimethylenepyrimidines substituted at the 4-position as in the reactant.

EXAMPLE 2

1,2-dihydro-1-hydroxy-2-imino - 5,6 - tetramethylene-4-piperidinopyrimidine and acid addition salts and carboxyacylates thereof

PART A.—2-AMINO-5,6-TETRAMETHYLENE - 4 - (2,4-DICHLOROPHENOXY)PYRIMIDINE

A mixture of 9.5 g. (0.055 mole) of 2-amino-5,6-tetramethylene-4-chloropyrimidine, 39.0 g. (0.24 mole) of 2,4-dichlorophenol, and 4.0 g. (0.06 mole) of 85% potassium hydroxide was heated at 90–100° C. for 2.5 hours. A solution of 18 g. of potassium hydroxide and 150 ml. of water was added, and the mixture was stirred for 20 minutes, then allowed to cool. The mixture was then filtered and the solid thus-obtained was washed thoroughly with water and recrystallized from 75% ethanol to yield 10.5 g. (62% of theory) of 2-amino-5,6-tetramethylene-4-(2,4-dichlorophenoxy)pyrimidine; M.P. 163–164° C.

Analysis.—Calcd. for $C_{14}H_{13}N_3OCl_2$: C, 54.21; H, 4.22; N, 13.55; Cl, 22.86. Found: C, 54.67; H, 4.43; N, 13.07; Cl, 23.34.

U.V. (ethanol) sh 220 m$\mu$($\epsilon$=19,300); 225 m$\mu$($\epsilon$=19,550); sh 259 m$\mu$($\epsilon$=2070); sh 275 m$\mu$($\epsilon$=5550); 285 m$\mu$($\epsilon$=7280).
(0.01 N $H_2SO_4$) 218 m$\mu$($\epsilon$=25,200); sh 225 m$\mu$($\epsilon$=22,600); sh 259 m$\mu$($\epsilon$=2950); sh 275 m$\mu$($\epsilon$=6170); sh 283 m$\mu$($\epsilon$=7740); 289 m$\mu$($\epsilon$=8950).
(0.01 N NaOH) sh 260 m$\mu$($\epsilon$=2675); sh 277 m$\mu$ ($\epsilon$=6180); 285 m$\mu$($\epsilon$=8840).
I.R. (principal bands; mineral oil mull) 3470, 3380, 3300, 3160, 1640, 1605, 1590, 1565, 1480, 1255, 1230, 1105, 1070, 830, 790 cm.$^{-1}$.

Following the procedure of Example 2, part A, but using in place of the 2,4-dichlorophenol, phenol; p-chlorophenol; p-bromophenol; 2,4-dibromophenol; and m-fluorophenol; and the like, there are obtained 2-amino-5,6-tetramethylene-4 - phenoxypyrimidine; 2-amino-5,6-tetramethylene-4 - (p-chlorophenoxy)pyrimidine; 2-amino-5,6-tetramethylene-4 - (p-bromophenoxy)pyrimidine; 2-amino-5,6-tetramethylene - 4-(2,4 - dibromophenoxy) pyrimidine; and 2-amino-5,6-tetramethylene-4-(m-fluorophenoxy)pyrimidine; and the like, respectively.

PART B.—1,2-DIHYDRO-1-HYDROXY-2-IMINO-5,6-TETRAMETHYLENE-4-(2,4-DICHLOROPHENOXY)PYRIMIDINE

A mixture of 43.5 g. (0.14 mole) of 2-amino-5,6-tetramethylene-4-(2,4-dichlorophenoxy)pyrimidine, 1200 ml. of ethylene glycol and 800 ml. of ethanol was heated until the solution was clear, quickly cooled to 0–5° C. and 35.7 g. (0.225 mole) of m-chloroperbenzoic acid was added over a ¾ hour period. The thus-obtained reaction mixture was stirred at 0–5° C. for 4 hours, poured into a solution of 15.0 g. of potassium hydroxide in 4000 ml. of water, allowed to stand until settled, and filtered. The solid was washed with water and recrystallized from 1000 ml. of acetonitrile to yield 19.9 g. (43% of theory) of 1,2-dihydro - 1-hydroxy-2-imino-5,6-tetramethylene-4-(2,4-dichlorophenoxy)pyrimidine; M.P. 198–200° C.

Analysis.—Calcd. for $C_{14}H_{13}N_3O_2Cl_2$: C, 51.55; H, 4.02; N, 12.88; Cl, 21.74. Found: C, 51.63; H, 3.90; N, 13.07; Cl, 21.55.

U.V. (ethanol) 219 m$\mu$($\epsilon$=29,000); 256 m$\mu$($\epsilon$=8700); 283 m$\mu$($\epsilon$=2510); 321 m$\mu$($\epsilon$=8150).
(0.01 N $H_2SO_4$) sh 220 m$\mu$($\epsilon$=25,750); sh 226 m$\mu$ ($\epsilon$=22,900); sh 275 m$\mu$($\epsilon$=4500); sh 283 m$\mu$($\epsilon$=6100); 296 m$\mu$($\epsilon$=7350).
(0.01 N NaOH) 223 m$\mu$($\epsilon$=28,200); 256 m$\mu$($\epsilon$=9300); 283 m$\mu$($\epsilon$=2300); 321 m$\mu$($\epsilon$=8800).

I.R. (principal bands; mineral oil mull) 3330, 3000 (broad), 1650, 1625, 1585, 1570, 1480, 1225, 1100, 1090, 1060, 880, 870, 850, 815 cm.$^{-1}$.

Following the procedure of Example 2, part B, but using in place of the m-chloroperbenzoic acid, in separate experiments, perbenzoic acid; perphthalic acid; peracetic acid; 2,4-dichloroperbenzoic acid; p-methylperbenzoic acid; m-nitroperbenzoic acid and p-methoxyperbenzoic acid, the same product, 1,2-dihydro-1-hydroxy-2-imino-5,6-tetramethylene - 4-(2,4 - dichlorophenoxy)pyrimidine, is obtained.

Also following the procedure of Example 2, part B, but using in place of the 2-amino-5,6-tetramethylene-4-(2,4-dichlorophenoxy)pyrimidine, 2-amino-5,6 - tetramethylene-4-phenoxypyrimidine; 2-amino-5,6 - tetramethylene-4-(p-chlorophenoxy)pyrimidine; 2-amino-5,6 - tetramethylene-4-(p-bromophenoxy)pyrimidine; 2-amino-5,6- tetramethylene-4-(2,4-dibromophenoxy)pyrimidine; and 2-amino-5,6-tetramethylene-4-(m - fluorophenoxy)pyrimidine, and the like, there are obtained 1,2-dihydro-1-hydroxy-2-imino-5,6 - tetramethylene - 4 - phenoxypyrimidine; 1,2-dihydro-1-hydroxy-2-imino-5,6-tetramethylene-4-(p-chlorophenoxy)pyrimidine; 1,2 - dihydro-1-hydroxy-2-imino - 5,6-tetramethylene - 4 - (p-bromophenoxy)pyrimidine; 1,2dihydro-1-hydroxy-2-imino-5,6-tetramethylene-4-(2,4-dibromophenoxy)pyrimidine; and 1,2-dihydro-1-hydroxy-2-imino-5,6-tetramethylene - 4 - (m-fluorophenoxy)pyrimidine, and the like, respectively.

Addition of absolute ethanol containing one equivalent of hydrogen chloride to an absolute ethanol solution of 1,2-dihydro-1-hydroxy-2-imino - 5,6 - tetramethylene-4-(2,4-dichlorophenoxy)pyrimidine, or the other 1,2-dihydro-1-hydroxy-2-imino - 5,6-tetramethylene-4-substituted-pyrimidines given in Example 2, part B, followed by addition of about 4 volumes of diethyl ether, gives the corresponding 1,2-dihydro-1-hydroxypyrimidine hydrochloride. Similar separate use of benzoic acid, lactic acid, maleic acid, phosphoric acid, sulfuric acid, and succinic acid gives the corresponding 1,2-dihydro-1-hydroxypyrimidine acid addition salts.

PART C.—1,2-DIHYDRO-1-HYDROXY-2-IMINO-5,6-TETRAMETHYLENE-4-PIPERIDINOPYRIMIDINE

A mixture of 10.0 g. (0.03 mole) of 1,2-dihydro-1-hydroxy-2-imino - 5,6 - tetramethylene-4 - (2,4-dichlorophenoxy)pyrimidine and 100 ml. of piperidine was heated in a closed vessel in an oil bath at 140° C. for 2.5 hours, heated at 156° C. for 5 hours, allowed to cool to 25° C. and filtered to yield 4.8 g. of solid which was recrystallized from 500 ml. of acetonitrile to yield 3.7 g. (50% of theory) of 1,2-dihydro-1-hydroxy-2-imino-5,6-tetramethylene-4-piperidinopyrimidine; M.P. 212–214° C.

Analysis.—Calcd. for $C_{13}H_{20}N_4O$: C, 62.87; H, 8.12; N, 22.56; O, 6.66. Found: C, 62.59; H, 8.25; N, 21.42; O, 5.92.

U.V. (ethanol) 216 mμ (ε=22,350); sh 247 mμ (ε=6600); 271 mμ (ε=9900); 329 mμ (ε=12,100). (0.01 N H$_2$SO$_4$) 216 mμ (ε=20,550); sh 238 mμ (ε=9300); sh 261 mμ (ε=8450); 301 mμ ε=13,000). (0.01 N NaOH) 217.5 mμ (ε=20,600); sh 243 mμ (ε=7250); 270 mμ (ε=9950); 328 mμ (ε=12,000). I.R. (principal bands; mineral oil mull) 3440, 3300, 2740, 1635, 1585, 1540, 1215, 1115 cm.$^{-1}$.

Addition of absolute ethanol containing one equivalent of hydrogen chloride to an absolute ethanol solution of 1,2-dihydro-1-hydroxy-2-imino - 5,6 - tetramethylene-4-piperidinopyrimidine, followed by addition of about 4 volumes of diethyl ether, gives the corresponding monohydrochloride. Similar use of 2 equivalents of hydrogen chloride gives the corresponding dihydrochloride. Similar separate use of benzoic acid, lacetic acid, succinic acid, maleic acid, sulfuric acid, and phosphoric acid gives the corresponding 1,2-dihydro-1-hydroxypyrimidine acid addition salts.

Following the procedure of Example 2, part C, but using in place of the piperidine, dimethylamine; diethylamine; dibutylamine; N-methylbutylamine; N-ethylhexylamine; butylamine; octylamine; diallylamine; dicrotylamine; di(2-hexenyl)amine; N-methylallylamine; allylamine; 2-octenylamine; dibenzylamine; diphenethylamine; N-methylbenzylamine; N - ethyl - (1-naphthylmethyl)-amine; benzylamine; 3-phenylpropylamine; cyclohexylamine; dicyclohexylamine; cyclobutylamine; N-methyl-(4-tert-butylcyclohexyl)amine; azetidine; pyrrolidine; 2-methylpyrrolidine; 3-ethylpyrrolidine; 2,5-dimethylpyrrolidine; 2-methyl-5-ethylpiperidine; 3-isopropylpiperidine; 2,4,6-trimethylpiperidine; hexahydroazepine; 4-tert-butylhexahydroazepine; heptamethylenimine; octamethylenimine; morpholine; 2-ethylmorpholine; and N-methylpiperazine, and the like, there are obtained:

1,2-dihydro-1-hydroxy-2-imino-5,6-tetramethylene-4-dimethylaminopyrimidine,
1,2-dihydro-1-hydroxy-2-imino-5,6-tetramethylene-4-diethylaminopyrimidine,
1,2-dihydro-1-hydroxy-2-imino-5,6-tetramethylene-4-dibutylaminopyrimidine,
1,2-dihydro-1-hydroxy-2-imino-5,6-tetramethylene-4-(N-methylbutylamino)pyrimidine,
1,2-dihydro-1-hydroxy-2-imino-5,6-tetramethylene-4-(N-ethylhexylamino)pyrimidine,
1,2-dihydro-1-hydroxy-2-imino-5,6-tetramethylene-4-butylaminopyrimidine,
1,2-dihydro-1-hydroxy-2-imino-5,6-tetramethylene-4-octylaminopyrimidine,
1,2-dihydro-1-hydroxy-2-imino-5,6-tetramethylene-4-diallylaminopyrimidine,
1,2-dihydro-1-hydroxy-2-imino-5,6-tetramethylene-4-dicrotylaminopyrimidine,
1,2-dihydro-1-hydroxy-2-imino-5,6-tetramethylene-4-[di-2(hexenyl)amino]pyrimidine,
1,2-dihydro-1-hydroxy-2-imino-5,6-tetramethylene-4-(N-methylallylamino)pyrimidine,
1,2-dihydro-1-hydroxy-2-imino-5,6-tetramethylene-4-allylaminopyrimidine,
1,2-dihydro-1-hydroxy-2-imino-5,6-tetramethylene-4-(2-octenylamino)pyrimidine,
1,2-dihydro-1-hydroxy-2-imino-5,6-tetramethylene-4-dibenzylaminopyrimidine,
1,2-dihydro-1-hydroxy-2-imino-5,6-tetramethylene-4-diphenethylaminopyrimidine,
1,2-dihydro-1-hydroxy-2-imino-5,6-tetramethylene-4-(N-methylbenzylamino)pyrimidine,
1,2-dihydro-1-hydroxy-2-imino-5,6-tetramethylene-4-[N-ethyl-(1-naphthylmethyl)amino]pyrimidine,
1,2-dihydro-1-hydroxy-2-imino-5,6-tetramethylene-4-benzylaminopyrimidine,
1,2-dihydro-1-hydroxy-2-imino-5,6-tetramethylene-4-(3-phenylpropylamino)pyrimidine,
1,2-dihydro-1-hydroxy-2-imino-5,6-tetramethylene-4-cyclohexylaminopyrimidine,
1,2-dihydro-1-hydroxy-2-imino-5,6-tetramethylene-4-dicyclohexylaminopyrimidine,
1,2-dihydro-1-hydroxy-2-imino-5,6-tetramethylene-4-cyclobutylaminopyrimidine,
1,2-dihydro-1-hydroxy-2-imino-5,6-tetramethylene-4-[N-methyl-(4-tert-butylcyclohexyl)amino]pyrimidine,
1,2-dihydro-1-hydroxy-2-imino-5,6-tetramethylene-4-(1-azetidinyl)pyrimidine,
1,2-dihydro-1-hydroxy-2-imino-5,6-tetramethylene-4-(1-pyrrolidinyl)pyrimidine,
1,2-dihydro-1-hydroxy-2-imino-5,6-tetramethylene-4-[1,(2-methylpyrrolidinyl)]pyrimidine,
1,2-dihydro-1-hydroxy-2-imino-5,6-tetramethylene-4-[1-(3-ethylpyrrolidinyl)]pyrimidine,
1,2-dihydro-1-hydroxy-2-imino-5,6-tetramethylene-4-[1-(2,5-dimethylpyrrolidinyl)]pyrimidine, 1,2-dihydro-1-hydroxy-2-imino-5,6-tetramethylene-4-
(2-methyl-5-ethylpiperidino)pyrimidine,
1,2-dihydro-1-hydroxy-2-imino-5,6-tetramethylene-4-
(3-isopropylpiperidono)pyrimidine,
1,2-dihydro-1-hydroxy-2-imino-5,6-tetramethylene-4-
(2,4,6-trimethylpiperidono)pyrimidine,
1,2-dihydro-1-hydroxy-2-imino-5,6-tetramethylene-4-
(1-hexahydroazepinyl)pyrimidine,
1,2-dihydro-1-hydroxy-2-imino-5,6-tetramethylene-4-
[1-(4-tert-butylhexahydroazepinyl)]pyrimidine,
1,2-dihydro-1-hydroxy-2-imino-5,6-tetramethylene-4-
heptamethyleniminopyrimidine,
1,2-dihydro-1-hydroxy-2-imino-5,6-tetramethylene-4-
octamethyleniminopyrimidine,
1,2-dihydro-1-hydroxy-2-imino-5,6-tetramethylene-4-
morpholinopyrimidine,
1,2-dihydro-1-hydroxy-2-imino-5,6-tetramethylene-4-
(2-ethylmorpholino)pyrimidine,
1,2-dihydro-1-hydroxy-2-imino-5,6-tetramethylene-4-
(4-methyl-1-piperazinyl)pyrimidine, and the like, respectively.

Following the procedure of Example 2, part C, each of the above-mentioned specific 1,2-dihydro - 1 - hydroxypyrimidines is transformed to the corresponding hydrochloric acid, benzoic acid, lactic acid, maleic acid, phosphoric acid, sulfuric acid, and succinic acid addition salts.

Also following the procedure of Example 2, but using in place of the piperidine, each of the primary and secondary amines corresponding to each of the specific examples of

and heterocyclic moieties within the scope of R as defined and given above, there are obtained the corresponding 1,2-dihydro-1-hydroxy - 2 - imino - 5,6 - tetramethylenepyrimidines, substituted at the 4-position with a monosubstituted or disubstituted, including heterocyclic, amino moiety.

PART D.—1,2-DIHYDRO-1-HYDROXY-2-ACETYLIMINO-5,6-TETRAMETHYLENE-4-PIPERIDINOPYRIMIDINE

A mixture of 1,2-dihydro-1-hydroxy-2-imino-5,6-tetramethylene-4-piperidinopyrimidine (4.1 g.), acetic anhydride (4.0 ml.), and diethyl ether (200 ml.) is stirred at 25° C. for 60 hours. The solid which forms is filtered and washed with ether to give a solid which is recrystallized from 400 ml. of dimethylformamide to give 1,2-dihydro-1-hydroxy-2-acetylimino - 5,6 - tetramethylene-4-piperidinopyrimidine.

Following the procedure of Example 2, part D, but using acetyl chloride in place of the acetic anhydride, the same product is obtained. Also following the procedure of Example 2, part D, but using in place of the acetic anhydride, propionic anhydride; crotonic anhydride; cyclohexanecarboxylic anhydride; isobutyryl chloride; decanoyl chloride; phenylacetyl chloride; 3-methoxybutyric anhydride; p-tert-butylcyclohexanecarbonyl chloride; and p-nitrophenylacetyl chloride, there are obtained:

1,2-dihydro-1-hydroxy-2-propionylimino-5,6-tetramethylene-4-piperidinopyrimidine,
1,2-dihydro-1-hydroxy-2-crotonylimino-5,6-tetramethylene-4-piperidinopyrimidine,
1,2-dihydro-1-hydroxy-2-cyclohexanecarbonylimino-5,6-tetramethylene-4-piperidinopyrimidine,
1,2-dihydro-1-hydroxy-2-isobutyrylimino-5,6-tetramethylene-4-piperidinopyrimidine,
1,2-dihydro-1-hydroxy-2-decanoylimino-5,6-tetramethylene-4-piperidinopyrimidine,
1,2-dihydro-1-hydroxy-2-phenylacetylimino-5,6-tetramethylene-4-piperidinopyrimidine,
1,2-dihydro-1-hydroxy-2-(3-methoxybutyrylimino)-5,6-tetramethylene-4-piperidinopyrimidine,
1,2-dihydro-1-hydroxy-2(p-tert-butylcyclohexanecarbonylimino)-5,6-tetramethylene-4-piperidinopyrimidine, and
1,2-dihydro-1-hydroxy-2-(p-nitrophenylacetylimino)-5,6-tetramethylene-4-piperidinopyrimidine, respectively.

Also following the procedure of Example 2, part D, but using in place of the 1,2-dihydro-1-hydroxy-2-imino-5,6-tetramethylene-4-piperidinopyrimidine, each of the above-mentioned 1,2-dihydro-1-hydroxy - 2 - imino-5,6-tetramethylenepyrimidines substituted at the 4-position with a mono-substituted or disubstituted including heterocyclic amino moiety or with a phenoxy or halophenoxy moiety, there are obtained the corresponding 1,2-dihydro-1-hydroxy-2-acetylimino - 5,6 - tetramethylenepyrimidines substituted at the 4-position as in the reactant.

Also following the procedure of Example 2, part D, but using in place of the combination of the 1,2-dihydro-1-hydroxy-2-imino - 5,6 - tetramethylene - 4 - piperidinopyrimidine and the acetic anhydride, each of the above-mentioned 1,2-dihydro-1-hydroxy - 2-imino-5,6-tetramethylenepyrimidines, variously substituted at the 4-position as above-described and each of the above-mentioned carboxylic acid anhydrides and each of the above-mentioned carboxylic acid chlorides, there are obtained the corresponding 1,2-dihydro-1-hydroxy - 2 - carboxyacylimino-5,6-tetramethylenepyrimidines substituted at the 4-position as in the reactant.

The following examples relate to the use of the novel compounds of this invention as antihypertensive agents. Each example relates to that use of 1,2-dihydro-1-hydroxy-2-imino-5,6-tetramethylene - 4 - piperidinopyrimidine. The other Formulas I, II and III are novel compounds of this invention and their acid addition salts can be used in a similar manner, and these examples should not be construed as limiting.

EXAMPLE 3

Tablets 20,000 scored tablets for oral use, each containing 200 mg. of 1,2-dihydro-1-hydroxy-2-imino-5,6-tetramethylene-4-piperidinopyrimidine free base are prepared from the following ingredients:

| | Gm. |
|---|---|
| 1,2-dihydro-1-hydroxy - 2 - imino-5,6-tetramethylene-4-piperidinopyrimidine, micronized | 4000 |
| Starch, U.S.P. | 350 |
| Talc, U.S.P. | 250 |
| Calcium stearate | 35 |

The micronized 1,2-dihydro-1-hydroxy - 2 - imino-5,6-tetramethylene-4-piperidinopyrimidine free base is granulated with a 4 percent w./v. aqueous solution of methylcellulose U.S.P. (1500 cps.). To the dried granules is added a mixture of the remainder of the ingredients and the final mixture is compressed into tablets of proper weight. Satisfactory clinical response is obtained in adults showing hypertension with 1 tablet which can be repeated in 4 hours, if necessary. For moderate conditions, a half tablet is used.

EXAMPLE 4

Capsules 20,000 two-piece hard gelatin capsules for oral use, each containing 100 mg. of 1,2-dihydro-1-hydroxy-2-imino - 5,6 - tetramethylene - 4 - piperidinopyrimidine free base are prepared from the following ingredients:

| | Gm. |
|---|---|
| 1,2 - dihydro - 1 - hydroxy - 2 - immino - 5,6 - tetramethylene-4-piperidinopyrimidine | 2000 |
| Lactose, U.S.P. | 1000 |
| Starch, U.S.P. | 300 |
| Talc, U.S.P. | 65 |
| Calcium stearate | 25 |

The micronized 1,2-dihydro-1-hydroxy-2-imino-5,6-tetramethylene-4-piperidinopyrimidine free base is mixed with the starch-lactose mixture followed by the talc and calcium stearate. The final mixture is then encapsulated in the usual manner. One capsule is used every 3 hours to control hypertension.

Capsules containing 10, 25, 50 and 350 mg. of 1,2-dihydro-1-hydroxy-2-imino-5,6-tetramethylene-4-piperidinopyrimidine free base are also prepared by substituting 200, 500, 1000 and 7000 gm. for 2000 gm. in the above formulation.

EXAMPLE 5

Soft elastic capsules

One-piece soft elastic capsules for oral use, each containing 5 mg. of 1,2-dihydro-1-hydroxy-2-imino-5,6-tetramethylene-4-piperidinopyrimidine free base are prepared in the usual manner by first dispersing the powdered active material in sufficient corn oil to render the material capsulatable.

EXAMPLE 6

Aqueous preparation

An aqueous preparation for oral use containing in each 5 ml., 50 mg. of 1,2-dihydro-1-hydroxy-2-imino-5,6-tetramethylene-4-piperidinopyrimide hydrochloride is prepared from the following ingredients:

| Ingredient | Amount |
|---|---|
| 1,2-dihydro-1-hydroxy-2-imino-5,6-tetramethylene-4-piperidinopyrimidine hydrochloride | 100 gm |
| Methylparaben, U.S.P. | 7.5 gm |
| Propylparaben, U.S.P. | 2.5 gm |
| Saccharin sodium | 12.5 gm |
| Cyclamate sodium | 2.5 gm |
| Glycerin | 3000 ml |
| Tragacanth powder | 10 gm |
| Orange oil flavor | 10 gm |
| F.D. and C. orange dye | 7.5 gm |
| Deionized water, q.s. to | 10,000 ml |

EXAMPLE 7

Parenteral suspension

A sterile aqueous suspension suitable for intramuscular injection and containing in each milliliter, 25 mg. of 1,2-dihydro-1-hydroxy-2-imino-5,6-tetramethylene-4-piperidinopyrimidine free base is prepared from the following ingredients:

| Ingredient | Amount |
|---|---|
| Polyethylene glycol 4000, U.S.P. | 3 gm |
| Sodium chloride | 0.9 gm |
| Polysorbate 80, U.S.P. | 0.4 gm |
| Sodium metabisulfite | 0.1 gm |
| Methylparaben, U.S.P. | 0.18 gm |
| Propylparaben, U.S.P. | 0.02 gm |
| 1,2-dihydro-1-hydroxy-2-imino-5,6-tetramethylene-4-piperidinopyrimidine free base (micronized) | 2.5 gm |
| Water for injection, q.s. to | 100 ml |

EXAMPLE 8

Aqueous solution

An aqueous solution of oral use and containing in each 5 ml., 25 mg. of 1,2-dihydro-1-hydroxy-2-imino-5,6-tetramethylene-4-piperidinopyrimidine free base is prepared from the following ingredients:

| Ingredient | Amount |
|---|---|
| 1,2-dihydro-1-hydroxy-2-imino-5,6-tetramethylene-4-piperidinopyrimidine free base | 5 gm |
| Deionized water, q.s. to | 1000 ml |

EXAMPLE 9

Parenteral solution

A sterile aqueous solution for intravenous or intramuscular injection and containing 20 mg. of 1,2-dihydro-1-hydroxy-2-imino-5,6-tetramethylene-4-piperidinopyrimidine maleate in each 2 ml. is prepared from the following ingredients:

| Ingredient | Amount |
|---|---|
| 1,2-dihydro-1-hydroxy-2-imino-5,6-tetramethylene-4-piperidinopyrimidine maleate | 10 gm |
| Chlorobutanol | 3 gm |
| Water for injection, q.s. to | 1000 ml |

EXAMPLE 10

Capsules

One thousand hard gelatin capsules for oral use, each containing 25 mg. of 1,2-dihydro-1-hydroxy-2-imino-5,6-tetramethylene-4-piperidinopyrimidine free base and 25 mg. of hydrochlorothiazide are prepared from the following ingredients:

| Ingredient | Gm. |
|---|---|
| 1,2-dihydro-1-hydroxy-2-imino-5,6-tetramethylene-4-piperidinopyrimidine free base micronized | 25 |
| Hydrochlorothiazide | 25 |
| Starch | 125 |
| Talc | 25 |
| Magnesium stearate | 15 |

One capsule 2 to 4 times a day is advantageous in the relief of moderate to severe hypertension in adult humans.

EXAMPLE 11

Capsules

One thousand hard gelatin capsules for oral use, each containing 50 mg. of 1,2-dihydro-1-hydroxy-2-imino-5,6-tetramethylene-4-piperidinopyrimidine free base, 25 mg. of hydrochlorothiazide, 0.1 mg. of reserpine, and 400 mg. of potassium chloride are prepared from the following ingredients:

| Ingredient | Gm. |
|---|---|
| 1,2-dihydro-1-hydroxy-2-imino-5,6-tetramethylene-4-piperidinopyrimidine free base micronized | 50 |
| Hydrochlorothiazide | 25 |
| Reserpine | 0.1 |
| Potassium chloride | 400 |
| Talc | 75 |
| Magnesium stearate | 20 |

One or two capsules daily is advantageously used for reducing hypertension.

EXAMPLE 12

Tablets

Ten thousand tablets for oral use, each containing 50 mg. of 1,2-dihydro-1-hydroxy-2-imino-5,6-tetramethylene-4-piperidinopyrimidine free base and 25 mg. of chlorisondamine chloride, are prepared from the following ingredients:

| Ingredient | Gm. |
|---|---|
| 1,2-dihydro-1-hydroxy-2-imino-5,6-tetramethylene-4-piperidinopyrimidine free base | 500 |
| Chlorisondamine chloride | 250 |
| Lactose | 1200 |
| Corn starch | 500 |
| Talc | 500 |
| Calcium stearate | 25 |

The powdered ingredients are thoroughly mixed and slugged. The slugs are broken down into granules which are then compressed into tablets. For relief of hypertension in adult humans, 1 tablet is administered 1 to 4 times daily after meals.

EXAMPLE 13

Tablets

Ten thousand scored tablets for oral use, each containing 25 mg. of 1,2-dihydro-1-hydroxy-2-imino-5,6-tetramethylene-4-piperidinopyrimidine free base and 0.1 mg. of reserpine, are prepared from the following ingredients and using the procedure of Example 3.

| | Gm. |
|---|---|
| 1,2-dihydro-1-hydroxy-2-imino-5,6-tetramethylene-4-piperidinopyrimidine free base | 250 |
| Reserpine | 1 |
| Lactose | 1500 |
| Corn starch | 500 |
| Talc | 500 |
| Calcium stearate | 25 |

This combination of active materials is effective in adult humans for the reduction of hypertension. The dose is one-half to two tablets 3 times a day depending on the severity of the condition.

EXAMPLE 14

*Capsules*

Ten thousand hard gelatin capsules for oral use, each containing 25 mg. of 1,2-dihydro-1-hydroxy-2-imino-5,6-tetramethylene-4-piperidinopyrimidine free base and 200 mg. of meprobamate, are prepared from the following ingredients:

| | Gm. |
|---|---|
| 1,2-dihydro-1-hydroxy-2-imino-5,6-tetramethylene-4-piperidinopyrimidine free base | 250 |
| Meprobamate | 2000 |
| Starch | 350 |
| Talc | 250 |
| Calcium stearate | 150 |

One capsule 4 times a day is useful in the treatment of hypertension.

EXAMPLE 15

*Tablets*

Ten thousand tablets for oral use, each containing 25 mg. of 1,2-dihydro-1-hydroxy-2-imino-5,6-tetramethylene-4-piperidinopyrimidine free base and 40 mg. of ethoxzolamide, are prepared from the following ingredients:

| | Gm. |
|---|---|
| 1,2-dihydro-1-hydroxy-2-imino-5,6-tetramethylene-4-piperidinopyrimidine free base | 250 |
| Ethoxzolamide | 400 |
| Lactose | 1200 |
| Corn starch | 500 |
| Talc | 500 |
| Calcium stearate | 25 |

The powdered ingredients are thoroughly mixed and slugged. The slugs are broken into granules which are then compressed into tablets. For relief of hypertension in adult humans, 1 tablet is administered 2 to 4 times daily.

We claim:

1. A compound selected from the group consisting of the free base form, acid addition salts, and carboxyacylates of a compound of the formula:

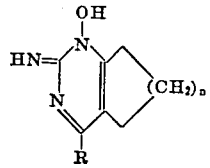

wherein R is a moiety selected from the group consisting of moieties of the formula

wherein $R_1$ and $R_2$ are selected from the group consisting of hydrogen, lower alkyl, lower alkenyl, lower aralkyl, and lower cycloalkyl, with the proviso that both $R_1$ and $R_2$ are not hydrogen, and the heterocyclic moieties aziridinyl, azetidinyl, pyrrolidinyl, piperidino, hexahydroazepinyl, heptamethylenimino, octamethylenimino, morpholino, and 4-lower-alkylpiperazinyl, each of said heterocyclic moieties having attached as substituents on carbon atoms thereof zero to 3 lower alkyls, inclusive, a nitrogen atom of each of said heterocyclic moieties being the point of attachment of R to the ring in said formula, and $n$ is 1 or 2.

2. 1,2-dihydro-1-hydroxy-2-imino-5,6-trimethylene-4-piperidinopyrimidine, the compound of the formula of claim 1 where R is piperidino and $n$ is 1.

3. 1,2-dihydro-1-hydroxy-2-imino-5,6-tetramethylene-4-piperidinopyrimidine, the compound of the formula of claim 1 where R is piperidino and $n$ is 2.

4. A compound selected from the group consisting of the free base form and acid addition salts of a compound of the formula:

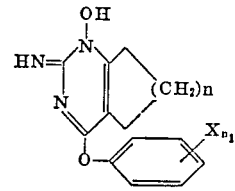

wherein

X is selected from the group consisting of fluorine, chlorine and bromine, $n$ is 1 or 2, and $n_1$ is zero to 3, inclusive.

5. 1,2-dihydro-1-hydroxy-2-imino-5,6-trimethylene-4-(2,4-dichlorophenoxy)pyrimidine, the compound of the formula of claim 4 where $n$ is 1, X is chlorine and $n_1$ is 2.

6. 1,2-dihydro-1-hydroxy-2-imino-5,6-tetramethylene-4-(2,4-dichlorophenoxy)pyrimidine, the compound of the formula of claim 4 where $n$ is 2, X is chlorine and $n_1$ is 2.

7. A compound of the formula:

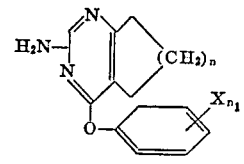

wherein

X is selected from the group consisting of fluorine, chlorine, and bromine, $n$ is 1 or 2, and $n_1$ is zero to 3, inclusive.

8. 2-amino-5,6-trimethylene-4-(2,4-dichlorophenoxy)pyrimidine, the compound of the formula of claim 7 where $n$ is 1, X is chlorine and $n_1$ is 2.

9. 2-amino-5,6-tetramethylene-4-(2,4-dichlorophenoxy)pyrimidine, the compound of the formula of claim 7 where $n$ is 2, X is chlorine and $n_1$ is 2.

References Cited

UNITED STATES PATENTS 3,168,521  2/1965  Wagner _____ 260—256.4

ALEX MAZEL, *Primary Examiner.*

M. U. O'BRIEN, R. J. GALLAGHER,

*Assistant Examiners.*

UNITED STATES PATENT OFFICE
CERTIFICATE OF CORRECTION

Patent No. 3,357,981　　　　　　　　　　　　　　December 12, 1967

Joseph J. Ursprung et al.

It is hereby certified that error appears in the above numbered patent requiring correction and that the said Letters Patent should read as corrected below.

Column 6, line 43, for "acid, and two" read -- acid, the two --; column 7, line 5, for "purfified" read -- purified --; column 8, line 53, for "precipiatte" read -- precipitate --; column 17, line 25, for "1,2dihydro-" read -- 1,2-dihydro- --; line 40, for "orresponding" read -- corresponding --; line 59, for "mμ ε=13,000)" read -- mμ (ε=13,000) --; column 19, line 4 for "isopropylpiperidono" read -- isopropylpiperidino --; line 6, for "trimethylpiperidono" read -- trimethylpiperidino --; column 21, line 62, for "of oral" read -- for oral --; column 24, lines 45 to 50, the formula should appear as shown below instead of as in the patent:

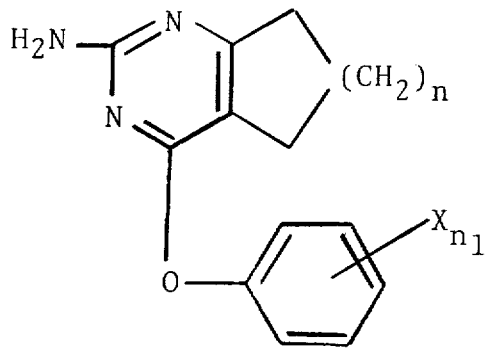

Signed and sealed this 18th day of February 1969.

(SEAL)
Attest:

EDWARD M. FLETCHER, JR.　　　　　　　　　EDWARD J. BRENNER
Attesting Officer　　　　　　　　　　　　　Commissioner of Patents